(12) United States Patent
Brien

(10) Patent No.: US 10,407,847 B1
(45) Date of Patent: Sep. 10, 2019

(54) RAPID FORMING INTERMEDIATE PAVING MATERIAL

(71) Applicant: Joshua V. Brien, Mayfield, KY (US)

(72) Inventor: Joshua V. Brien, Mayfield, KY (US)

( * ) Notice: Subject to any disclaimer, the term of this patent is extended or adjusted under 35 U.S.C. 154(b) by 274 days.

(21) Appl. No.: 14/871,226

(22) Filed: Sep. 30, 2015

Related U.S. Application Data

(63) Continuation-in-part of application No. 13/768,954, filed on Feb. 15, 2013, now Pat. No. 9,181,663.

(60) Provisional application No. 61/600,003, filed on Feb. 17, 2012.

(51) Int. Cl.
| | |
|---|---|
| *E01C 19/22* | (2006.01) |
| *E01C 23/06* | (2006.01) |
| *E01C 21/00* | (2006.01) |
| *E01C 23/03* | (2006.01) |
| *E02D 3/12* | (2006.01) |
| *C09K 17/00* | (2006.01) |

(52) U.S. Cl.
CPC ............ *E01C 23/065* (2013.01); *E01C 19/22* (2013.01); *E01C 21/00* (2013.01); *E01C 23/03* (2013.01); *E02D 3/123* (2013.01); *C09K 17/00* (2013.01)

(58) Field of Classification Search
CPC ........ C08L 95/005; E01C 7/353; E01C 7/356; E01C 7/35; E01C 11/005
USPC ......................................... 427/136, 138, 139
See application file for complete search history.

(56) References Cited

U.S. PATENT DOCUMENTS

| | | | | |
|---|---|---|---|---|
| 5,151,456 | A | * 9/1992 | Elias | ..................... C08L 95/005 106/277 |
| 2007/0275161 | A1 | * 11/2007 | Buras | ..................... C08L 95/00 427/138 |
| 2010/0047015 | A1 | * 2/2010 | Takamura | ............... E01C 7/353 404/31 |

OTHER PUBLICATIONS

Loan, L.D., Peroxide Crosslinking Reactions of Polymers, Pure and Applied Chemistry, vol. 30, Nos. 1-2, p. 173-180, Dec. 1972.
Royal Society of Chemistry, PVA Polymer Slime, pp. 228-231, Feb. 2008.
Mall, D. et al., Caulking Compounds and Sealants, Coatingstech, pp. 50-56, Mar. 2010.

\* cited by examiner

*Primary Examiner* — Dah-Wei D. Yuan
*Assistant Examiner* — Nga Leung V Law

(57) ABSTRACT

Disclosed is a rapid forming intermediate paving material to accommodate efficient movement of heavy loads, including but not limited to heavy loads necessitated by large-scale agricultural operations. Also disclosed is a process for producing such a paving material. Producing such a paving material may be advantageous either preceding or following precipitation events, as cross linking agents allow somewhat rapid formation of a portion of polymer film thus quickly forming a durable surface for said dirt or gravel road.

14 Claims, 6 Drawing Sheets

RAPID FORMING INTERMEDIATE PAVING MATERIAL

CROSS-REFERENCE TO RELATED APPLICATIONS

This application is a continuation-in-part of U.S. application Ser. No. 13/768,954, filed Feb. 15, 2013, which nonprovisional application claimed priority on the basis of U.S. Provisional Application No. 61/600,003, filed Feb. 17, 2012, each of which is incorporated herein by reference in its entirety.

FIELD OF THE INVENTION

The field relates in various embodiments to a paving material which will accommodate efficient movement of heavy loads, including but not limited to heavy loads necessitated by large-scale agricultural operations.

BACKGROUND OF THE INVENTION

According to the World Business Council on Sustainable Development, the three "pillars" of sustainable development are economic growth, ecological balance and social progress, and one cannot have any one without the others.

Large-scale agricultural operations bear upon economic growth, ecological balance and social progress. In particular, crop planting, harvesting and maintenance operations continue to grow in scale with regard to both equipment size and tonnage of materials handled. The need exists for reliable pavement surfaces which will accommodate efficient movement of heavy loads between farm and market; however, the life cycle cost of "high type" pavement prohibits investment in areas which see the majority of their utilization within a few weeks per year—utilized during times of planting and harvesting.

Increased use of "high type" pavement in developed countries may be regarded as a long-term operational burden for governments, as maintenance costs associated with "high type" pavement require significant sources of ongoing funding. Conversion of existing secondary or farm to market roads into "high type" pavements may be properly regarded as suitable only if specific objectives may be attained—increased utilization, safety, etc.

There is accordingly a long-felt need for a durable material which will support efficient transfer of heavy loads while being significantly more economical in terms of both initial construction costs and long term maintenance costs when compared with existing "high type" pavements. There is a long-felt need for erosion mitigation in sections of farm to market and secondary roads which are most susceptible to washout and other erosive processes and events. There is also a long-felt need to for a paving material adaptable in terms of total cost to various long term road performance specifications. Additionally, there is a long-felt need for an environmentally favorable pavement material useful for mitigating erosion of embankments, shorelines, river banks and the like and accordingly providing a suitable, cost effective, sustainable building type alternative to use of traditional pavement materials, whether they be rigid (concrete) or elastic (asphalt).

Furthermore, the invention provides an efficient means for constructing a durable surface through utilization of various combinations of equipment commonly associated with farming, construction or earth moving activities. For example, an intermediate pavement material can be constructed through application of constituent materials from accessory tanks or supplemental storage devices on a dump truck during the dumping of construction materials. For example, an intermediate paving material can be constructed through application of constituent materials from accessory tanks or supplemental storage devices on a road grader (motor grader) during routine operation. For example, an intermediate paving material can be constructed utilizing accessory tanks or supplement storage devices in combination with tractor and end loader, back hoe, skid steer, gradall, excavator or any implement with mechanical (not limited to hydraulically operated) buckets, digging devices, blades, scrapers, rakes or graders. For example, an intermediate paving material may be constructed through constituent material addition from bins, beds, enclosures, bags, sacks, bottles, packages, barrels, drums, totes, tanks, tankers, tanker trucks, tanker trailers, trailers, containers, ISO containers, overseas containers, compartmentalized containers in series with common moving equipment, not limited to conveying equipment, feeding equipment, metering equipment, spreading equipment, specialized equipment, earth moving equipment, pans, dump beds, buckets, blades, rakes or scraping equipment either applying or moving construction materials to facilitate the operation. For example, an intermediate paving material may be constructed through constituent material addition from tanker trucks, ISO containers, overseas containers, compartmentalized containers in parallel with common earth moving equipment, not limited to pans, dump beds, buckets or scraping equipment either applying or moving construction materials to facilitate the operation. For example, an intermediate paving material may be constructed through constituent material addition from tanker trucks, ISO containers, overseas containers, compartmentalized containers with a combination of both series and parallel activities associated with common earth moving equipment, not limited to pans, dump beds, buckets or scraping equipment either applying or moving construction materials to facilitate the operation.

SUMMARY OF THE INVENTION

In various embodiments, a material such as is described herein may be constructed on a surface through steps including a disposition of a concentrated polymer on the surface to form a polymer layer; a disposition of a construction material on the polymer layer to form a construction material layer; a disposition of a diluent on the construction material layer to form a compactible mixture; and a compaction of the compactible mixture. A cross-linking agent is contacted with at least a portion of the polymer either before, during or after compaction. A cross-linking agent may be, but should not be limited to, any of various salts of boric acid; maleic anhydride; or, more generally, a composition known in either the cementitious materials arts or the polymeric materials arts to be a cross-linking agent. Often, salts of boric acid are referred to as borates, where examples include, but should not be limited to, sodium borate, sodium tetraborate, disodium tetraborate and/or potassium borate. Contacting the cross-linking agent with at least a portion of the polymer results in rapid formation of polymer film, thus quickly forming a durable pavement surface for a dirt or gravel road.

In various embodiments, a material such as is described herein may be made according to a process for rapidly improving the durability of a dirt or gravel road, the process comprising:

(a) applying a superior surface to said road, said superior surface comprising a plurality of layers of durability-enhancing compositions and a diluent;
   one of said layers of durability-enhancing compositions, an inferior layer, consisting essentially of:
      (i) a dry latex polymer powder or an aqueous dispersion of a latex polymer, and optionally a cross-linking agent;
      (ii) dry lime or an aqueous solution of lime;
      (ii) a substantially dry mixture of latex polymer and lime, and optionally a cross-linking agent; or
      (iii) an aqueous dispersion comprising lime and latex polymer, and optionally a cross-linking agent;
   another of said layers of durability-enhancing compositions, a particulate layer, consisting essentially of a particulate matter, said particulate matter comprising a conventional building material or a waste material;
   and wherein the inferior layer is inferior to the particulate layer and is in direct contact with the dirt or gravel road;
(b) optionally contacting an amount of a cross-linking agent with at least a portion of the particulate layer and permitting at least a portion of the amount of the cross-linking agent to traverse the particulate layer and migrate onto and/or into the inferior layer;
(c) compacting the superior surface;
thereby rapidly improving the durability of the dirt or gravel road.

DETAILED DESCRIPTION

Figure 1:
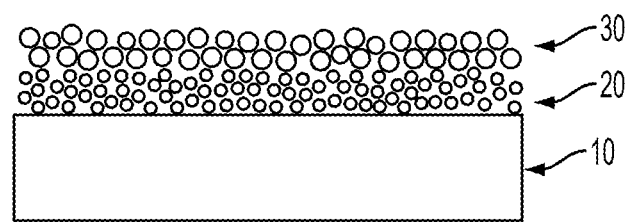
FIG. 1 shows an existing road or surface atop which has been placed a polymer layer, and atop which polymer layer has been placed a lime layer.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. "Or" as in "A or B" is conjunctive, not disjunctive, and accordingly in this instance means at least one member of the set {A, B}.

For soil stabilization, processes and/or materials known in the art have embodied a "top down" strategy for material application and subsequent stabilization. An embodiment of a "top down" strategy for soil stabilization known in the art may form a durable layer near the top of the stabilization surface. In the event of prior scarification, an embodiment of a "top down" application strategy known in the art may tend to form a layer of increasing resistance to erosion correlated to geometry or pattern of the scarifying device. When erosion occurs, or there is more generally any wearing away by application of force from without of an embodiment of a "top down" strategy known in the art, once the most durable layer is compromised, erosion may take place throughout the full depth of the material.

A material such as is described herein may be made according to a "bottom up" strategy in which there may be migration of constituents from each applied layer into adjacent or further distant layers, for example, including by diffusion, thus forming a somewhat monolithic pavement material which may for example possess an increasing durability profile with depth of intermediate pavement. A "bottom up" strategy such as is embodied by a material such as is described herein can provide either a uniform or a somewhat increasing profile of erosion resistance with depth of intermediate pavement. Such an increase in erosion resistance with pavement depth allows visible recognition of potential failure zones far in advance of total "wash out", thus lessening future maintenance costs while maintaining efficient flow of goods from farm to market.

A material such as is described herein delivers an economical alternative for "high type" pavement materials known in the art. A material such as is described herein can provide a platform for production of sustainable pavement by incorporating locally available components, either virgin or recycled, with latex polymers in a particular sequence which minimizes labor input by utilizing what may be regarded as a preferable concentration gradient when producing the pavement material. A material such as is described herein places either a layer or layers of binding material(s) onto an existing road surface or construction surface. The layer(s) of binding materials do not necessarily need to be the first layer of addition; however, the binding materials may preferably reside in a lower portion of the pavement being constructed for optimal heat, mass and momentum transfer. The binding materials are then covered with road building materials (construction materials) by any number of suitable means. A diluent material is then added to the road building materials by any sufficient means of diluent material addition. Other layer(s) of materials may be added to the construction process after addition of diluent. The binding material(s), construction material(s), diluent material(s) and any other layer(s) of material(s) are then compacted by any sufficient means of compaction. A preferred packing mechanism enhances diffusion of diluent through layer(s) of construction materials. Due to the effect of energy input from compacting and to diffusion of diluent materials, constituents contained in the layer(s) of binding materials will begin to diffuse through layers of construction materials ultimately resulting in a pavement material with somewhat monolithic properties. Unexpected, favorable results were obtained when a cross-linking agent was contacted with polymer, causing rapid formation of a film comprising at least a portion of the polymer, hence rapidly producing a durable road surface, useful, for example, for construction activities preceding precipitation events, following precipitation events or for correcting instances of excessive diluent addition. A pavement material such as is described herein does not require prior preparation of a surface on which the material is made. Prior preparation of the surface may be utilized, for example, if prior preparation will result in potential benefits providing further sustainability, with examples being either increased durability or favorable cost.

A process such as is described herein produces a bound, somewhat monolithic pavement layer utilizing a majority of common farm to market and secondary road construction materials in combination with latex polymer and optionally other binding materials. The finished, somewhat monolithic paving material is more resistant to erosion when compared with a variety of farm to market and secondary roads known in the art. Such erosion mitigation will reduce long term maintenance costs for roads constructed according to a process such as is described herein. A process such as is described herein provides a method to improve specific, problematic portions of farm to market or secondary road with a plurality of locally available materials, allowing resources to be focused on short distances of problematic road while optionally leaving any unreconstructed portion of road and its associated maintenance costs unchanged. A process such as is described herein provides a means for improving performance of existing farm to market and secondary roads while reducing future maintenance costs of said roads.

A user of a process such as is described herein or a prospective purchaser of an amount of material such as is described herein may specify long term pavement material performance in terms of total cost. One may control both project cost and road durability by varying total latex polymer content. For example, a 500 m length of red gravel and clay farm to market road with 5% grade in Graves County Kentucky may endure traffic associated with heavy equipment needed to sustain planting and harvesting operations for a period of five years if the road is constructed with overall polymer solids content of 10%; whereas, the same length of road if constructed with overall polymer solids content of 5% may endure traffic associated with planting and harvesting activities for a period of two years before a need for additional maintenance arises.

An embodiment may comprise the following:
Red gravel road
Liquid latex polymer dispersion is added with polymer solids content of 50% (polymer solids range is 2%-80%, as water to be added later before packing can be adjusted accordingly to ensure proper diffusion of polymer particles throughout intermediate paving material)
Polymer is covered with additional material (2 cm-200 cm, preferably 5 cm-30 cm, most preferably 6 cm-15 cm)
Lime is spread (either solid lime or solution) (can be at any point in the process including before polymer addition as lime ensures basic environment for polymer film formation and is also beneficial for creating an increase in load bearing capacity effect when combined with clay)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Water is added (diluent)
Road is compacted An embodiment may comprise the following:
Red gravel road
Dispersible polymer powder is added to surface to receive construction of intermediate paving material
Polymer is covered with additional material (2 cm-200 cm, preferably 5 cm-30 cm, most preferably 6 cm-15 cm)
Lime is spread (either solid lime or solution) (can be at any point in the process including before polymer addition as lime ensures basic environment for polymer film formation and is also beneficial for creating an increase in load bearing capacity effect when combined with clay)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Water is added (diluent)
Road is compacted An embodiment may comprise the following:
Red gravel road
Liquid latex polymer dispersion is added with polymer solids content of 50% (realistic polymer solids range is 2%-80% as water to be added later before packing can be adjusted accordingly to ensure proper diffusion of polymer particles throughout intermediate paving material)
Polymer is covered with additional material (2 cm-200 cm, preferably 5 cm-30 cm, most preferably 6 cm-15 cm)
Waste material (coal ash, ground granulated blast furnace slag (GGBS), recycled plastic, crushed brick, recycled asphalt, crushed concrete, recycled glass, shredded tires, etc)
Lime is spread (either solid lime or solution) (can be at any point in the process including before polymer addition as lime ensures basic environment for polymer film formation and is also beneficial for creating an increase in load bearing capacity effect when combined with clay)
Water is added (diluent)
Road is compacted
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

In some instances, the cross-linking agent may be added during compaction to ensure formation of a durable road after a precipitation event in the event of a scenario where excess diluent addition results in poor compaction for a given combination of construction materials.

An embodiment may comprise the following:

Red gravel road

Liquid latex polymer dispersion is added with polymer solids content of 50% (realistic polymer solids range is 2%-80% as water to be added later before packing can be adjusted accordingly to ensure proper diffusion of polymer particles throughout intermediate paving material)

Polymer is covered with additional material (2 cm-200 cm, preferably 5 cm-30 cm, most preferably 6 cm-15 cm)

Waste material (coal ash, ground granulated blast furnace slag (GGBS), recycled plastic, crushed brick, recycled asphalt, crushed concrete, recycled glass, shredded tires, etc)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)

Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

Road is compacted

An embodiment may comprise the following:

Red gravel road

Dispersible polymer powder is added to surface to receive construction of intermediate paving material Polymer is covered with additional material (2 cm-200 cm, preferably 5 cm-30 cm, most preferably 6 cm-15 cm)

Waste material (coal ash, ground granulated blast furnace slag (GGBS), recycle plastic, crushed brick, recycled asphalt, crushed concrete, recycled glass, shredded tires, etc)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)

Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

Road is compacted

An embodiment may comprise the following:

Dirt road

Liquid latex polymer dispersion is added with polymer solids content of 50% (polymer solids range is 2%-80% as water to be added later before packing can be adjusted accordingly to ensure proper diffusion of polymer particles throughout intermediate paving material)

Polymer is covered with additional material (2 cm-200 cm, preferably 5 cm-30 cm, most preferably 6 cm-15 cm)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)

Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

Road is compacted

An embodiment may comprise the following:

Dirt road

Dispersible polymer powder is added to surface to receive construction of intermediate paving material Polymer is covered with additional material (2 cm-200 cm, preferably 5 cm-30 cm, most preferably 6 cm-15 cm)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)

Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

Road is compacted

An embodiment may comprise the following:

Dirt road

Liquid latex polymer dispersion is added with polymer solids content of 50% (polymer solids range is 2%-80% as water to be added later before packing can be adjusted accordingly to ensure proper diffusion of polymer particles throughout intermediate paving material)

Polymer is covered with additional material (2 cm-200 cm, preferably 5 cm-30 cm, most preferably 6 cm-15 cm)

Waste material (coal ash, ground granulated blast furnace slag (GGBS), recycle plastic, shredded tires, etc)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Road is compacted
An embodiment may comprise the following:
Dirt road
Dispersible polymer powder is added to surface to receive construction of intermediate paving material
Polymer is covered with additional material (2 cm-200 cm, preferably 5 cm-30 cm, most preferably 6 cm-15 cm)
Waste material (coal ash, ground granulated blast furnace slag (GGBS), recycle plastic, crushed brick, recycled asphalt, crushed concrete, recycled glass, shredded tires, etc)
Lime is spread (either solid lime or solution) (can be at any point in the process including before polymer addition as lime ensures basic environment for polymer film formation and is also beneficial for creating an increase in load bearing capacity effect when combined with clay)
Water is added (diluent)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Road is compacted
An embodiment may comprise the following:
Limestone gravel road
Liquid latex polymer dispersion is added with polymer solids content of 50% (polymer solids range is 2%-80% as water to be added later before packing can be adjusted accordingly to ensure proper diffusion of polymer particles throughout intermediate paving material)
Polymer is covered with additional material (2 cm-200 cm, preferably 5 cm-30 cm, most preferably 6 cm-15 cm)
Lime is spread (either solid lime or solution) (can be at any point in the process including before polymer addition as lime ensures basic environment for polymer film formation and is also beneficial for creating an increase in load bearing capacity effect when combined with clay)
Water is added (diluent)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Road is compacted
An embodiment may comprise the following:
Limestone gravel road
Dispersible polymer powder is added to surface to receive construction of intermediate paving material
Polymer is covered with additional material (2 cm-200 cm, preferably 5 cm-30 cm, most preferably 6 cm-15 cm)
Lime is spread (either solid lime or solution) (can be at any point in the process including before polymer addition as lime ensures basic environment for polymer film formation and is also beneficial for creating an increase in load bearing capacity effect when combined with clay)
Water is added (diluent)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Road is compacted
An embodiment may comprise the following:
Limestone gravel road
Liquid latex polymer dispersion is added with polymer solids content of 50% (polymer solids range is 2%-80% as water to be added later before packing can be adjusted accordingly to ensure proper diffusion of polymer particles throughout intermediate paving material)
Polymer is covered with additional material (2 cm-200 cm, preferably 5 cm-30 cm, most preferably 6 cm-15 cm)
Waste material (coal ash, ground granulated blast furnace slag (GGBS), recycle plastic, shredded tires, etc)
Lime is spread (either solid lime or solution) (can be at any point in the process including before polymer addition as lime ensures basic environment for polymer film formation and is also beneficial for creating an increase in load bearing capacity effect when combined with clay)
Water is added (diluent)
Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)
Road is compacted
An embodiment may comprise the following:
Limestone gravel road
Dispersible polymer powder is added to surface to receive construction of intermediate paving material
Polymer is covered with additional material (2 cm-200 cm, preferably 5 cm-30 cm, most preferably 6 cm-15 cm)
Waste material (coal ash, ground granulated blast furnace slag (GGBS), recycle plastic, crushed brick, recycled asphalt, crushed concrete, recycled glass, shredded tires, etc)

Lime is spread (either solid lime or solution) (can be at any point in the process including before polymer addition as lime ensures basic environment for polymer film formation and is also beneficial for creating an increase in load bearing capacity effect when combined with clay)

Water is added (diluent)

Cross-linking agent, with an example being sodium borate, is added (such a cross-linking agent can be added as a particulate, such as a solid, or a liquid, such as a solution or a dispersion, in an amount suitable to promote rapid film formation when contacted with the polymer, wherein the mass ratio of cross-linking agent to polymer is, for example, between about 1:100 and about 100:1, or between about 1:33 and about 33:1, or between about 1:10 and about 10:1, or about 1:1)

Road is compacted

Dispersible polymer powders are characterized such that they disperse readily into their constituent polymer components when exposed to water thereby forming a tough, elastic water resistant polymer film. Examples include but are not limited to Vinnapas 5044N, Vinnapas 5010N and Vinnapas 8031H. Dispersible polymer powder materials should not be limited to a certain particle size distribution, as agglomerated particles, oversized particles or particles failing to pass a certain sieve mesh orientation are often viewed as suitable components. Such polymers are based on one or more monomers from the group consisting of vinyl esters, (meth) acrylates, vinyl aromatics, olefins, 1,3-dienes and vinyl halides and, if required, further monomers copolymerizable therewith.

Suitable vinyl esters are those of carboxylic acids having 1 to 12 C atoms. Vinyl acetate, vinyl propionate, vinyl butyrate, vinyl12-ethylhexanoate, vinyl laurate, 1-methylvinyl acetate, vinyl pivalate and vinyl esters of alpha branched monocarboxylic acids having 9 to 11 C atoms, for example VeoVa® or VeoVa10® (trade names of Resolution Performance Products), are preferred. Vinyl acetate is particularly preferred.

Suitable acrylate and methacrylate monomers include esters of straight chain or branched alcohols having 1 to 15 C atoms. Preferred methacrylates or acrylates are methyl acrylate, methyl methacrylate, ethyl acrylate, ethyl methacrylate, propyl aculrate, propyl methacrylate, n-butyl acrylate, n-butyl methacrylate, tert-butyl acrylate, ter-butyl methacrylate and 2-ethylhexul acrylate, methyl methacrylate, n-butyl acrylate, tert-butyl acrylate and 2-ethylehexyl acrylate are particularly preferred. Preferred vinyl aromatics are styrene, methylstyrene and vinyltoluene. A preferred vinyl halide is vinyl chloride. The preferred olefins are ethylene and propylene, and the preferred dienes are 1,3 butadiene and isoprene.

If required, 0.1 to 5% by weight, based on the total weight of the copolymer, of auxiliary monomers may also be copolymerized. Preferably, 0.5 to 2.5% by weight of auxiliary monomers is used. Examples of auxiliary monomers are ethylenically unsaturated mono and dicarboxylic acids, preferably acrylic acid, methacrylic acid, ethylenically unsaturated carboxamides and carbonitriles, preferably acrylamide and acrylonitrile, and ethylenically unsaturated sulfonic acids and their salts, preferably vinyl sulfonic acid and 2-acrylamido-2-methulpropane sulfonic acid. Further examples are precrosslinking co-monomers such as polyethylenically unsaturated comonomers, for example divinyl adipate or triallyl cyanurate, or postcrosslinking comonomers, for example N-methylolacrylamide (NMA), N-methylol-methacrylamide, alkyl ethers, such as the isobutoxy ether, or esters of N-methylolacrylamide. Comonomers having epoxide functional groups, sch as glycidyl methacrylate nad glycidyl acrylate are also suitable. Further examples of comonmers having silican functional groups are also suitable.

The choice of monomer or the choice of the amounts by weight of the comonomers is made in such a way that in general a glass transition temperature of −50° C. to +50° C., preferably −30° C. to +40° C. and most preferably −10° C. to +20° C. The glass transition temperature $T_g$ of the polymer can be determined in a known manner by means of differential scanning calorimetry (DSC). The glass transition temperature can also be calculated beforehand through use of the Fox equation according to T. G. Fox, Bull. Am. Phys. Soc. 1, 3, page 123 (1956). The following is applicable: $1/T_g = x_1/T_{g1} + x_2/T_{g2} + \ldots x_n/T_{gn}$, where $x_n$ is the mass fraction (% by weight/100) of the monomer n and $T_{gn}$ is the glass transition temperature in Kelvin of the homopolymer of the monomer n. $T_g$ values for homopolymers appear in Polymer Handbook, 2nd Edition, J. Wiley and Sons (1975).

Particularly preferred are homopolymers and copolymers of vinyl ester monomers, particularly vinyl acetate. Most preferred are polyvinyl acetate, copolymers of vinyl acetate and ethylene, copolymers comprising vinyl acetate, ethylene and a vinylester(s) of alpha branched monocarboxylic acids having 9 to 11 C atoms, it being possible for any of said polymers also to contain, if required, any one or more of the above mentioned auxiliary monomers.

Dispersible polymer powders are characterized such that they disperse readily into their constituent polymer components when exposed to water thereby forming a tough, elastic water resistant polymer film. At the present, a few examples from the vast possibilities of such products which are copolymers of vinyl acetate and ethylene are Vinnapas 5044N and Vinnapas 5010N. Thermoplastic latexes are not limited examples such as copolymers of vinyl acetate/ethylene (VAE or EVA), terpolymers of vinyl acetate/ethylene/vinyl chloride (VAE/VC), terpolymers of vinyl acetate/ethylene/veova (VAE/Veova), VAE/Veova/VC.

A latex polymer powder may be included in intermediate pavement design in a range from 2 to 70%. Preferred dispersible polymer powder design amounts are a range from 2 to 10%. Most preferred dispersible polymer powder mix design amounts are in the range from 2 to 8%.

The term cross linking agent refers to additives which "cross link" various polymer chains, thus ensuring rapid formation of polymeric material, perhaps in the state of cross linked polymer chains yielding formed polymer film, ultimately exhibiting fundamental properties of cross linked polymeric materials within the pavement structure. Examples of cross linking agents should not be limited to various salts of boric acid, borates, sodium borate, borax, maleic anhydride or any literary example of "cross linking" agents as they pertain to included polymeric materials. Cross linking polymeric materials is advantageous for construction of intermediate paving materials either before, during or following precipitation events, as cross linking a portion of included polymeric materials ensures rapid formation of a durable surface, thus lessening the influence of excessive diluent addition with regard to diluting the target percentage of polymer solids per given volume of pavement material.

The term "waste material" refers for example to coal combustion by-products, granulated blast furnace slag, ground granulated blast furnace slag, silica fume, recycled concrete, recycled aggregate, crushed brick, crumb rubber, shredded tires, shredded plastics, filter cakes, solids resulting from membrane type separation processes, solids resulting from reverse osmosis type separation processes, solids resulting from hydraulic compression filter operations, solids resulting from FSI bag type filter operations, belt press filter solids, solids precipitating or settling as a result of waste water treatment operations, essentially any solid type particles resulting from separation processes as recognized by those skilled in the art of separations, various geometries of plastic waste materials, etc. Coal combustion by-products include but are not limited to class C fly ash, class F fly ash, non-classified coal ash, bottom ash, cinders and materials from fluidized bed operations. Fly ash consists of finely divided ashes produced by burning pulverized coal in power plants. Fly ash is typically removed from combustion gas streams by some sort of mechanical device—examples are filter baghouses and electrostatic precipitators. When either bituminous or subbituminous coal or lignite is burned at high temperature, the mineral combustion products melt into fused droplets. The subsequent sudden cooling transforms the fused droplets partly or entirely into spherical glass particles. The chemical composition of the fly ash depends upon the mineral composition of the coal gangue—the inorganic part of the coal. ASTM C618 identifies two types of fly ash—class C and class F. Class C fly ash is often referenced for having higher concentrations of calcium containing materials such as lime.

Granulated and pelletised blastfurnace slag is produced by the rapid quenching of molten blastfurnace slag as it passes through spraying water followed by either a granulating process or a pelletizing process. The resulting material is largely glassy with typically at least 95 percent being glass exhibiting a composition close to that of the bulk composition, and the balance being crystals of either melilite or merwinite with some oldhamite and native iron.

Waste materials may be included in intermediate pavement designs in a range from 2 to 90%. Preferred waste material mix design amounts range from 40 to 80%. Most preferred waste material mix design amounts range from 50 to 60% by mass of the total dry mix.

Drawings and examples such as follow further illustrate the invention but do not limit its scope.

FIG. 1 shows an existing road or surface 10 atop which has been placed a polymer layer 20, and atop which polymer layer has been placed a lime layer 30.

Figure 2:
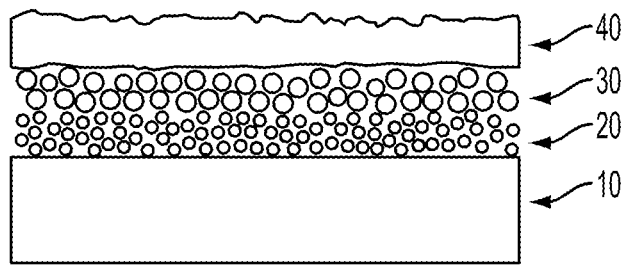
FIG. 2 shows an existing road or surface atop which has been placed a polymer layer, atop which polymer layer has been placed a lime layer, and atop which lime layer has been placed a construction material layer.

FIG. 2 shows an existing road or surface 10 atop which has been placed a polymer layer 20, atop which polymer layer has been placed a lime layer 30, and atop which lime layer has been placed a construction material layer 40.

Figure 3:
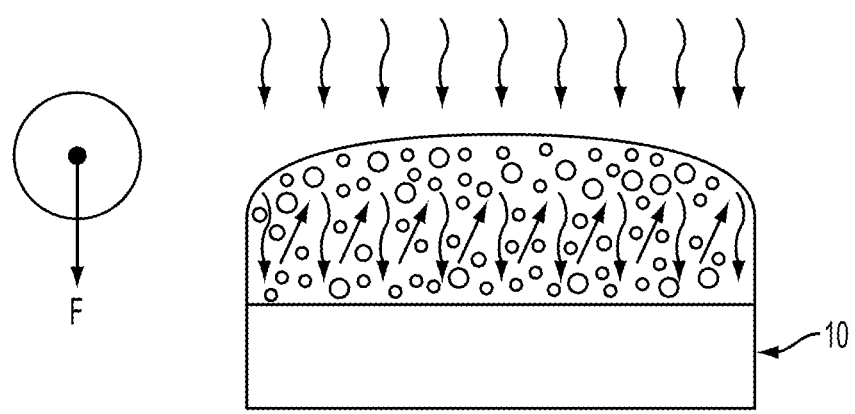
FIG. 3 shows mixing that has taken place through the application of force by compaction of a construction material layer, a lime layer beneath the construction material layer, and a polymer layer beneath the lime layer, atop an existing road or surface.

FIG. 3 shows mixing that has taken place through the application of force by compaction of a construction material layer, a lime layer beneath the construction material layer, and a polymer layer beneath the lime layer, atop an existing road or surface 10.

Figure 4:
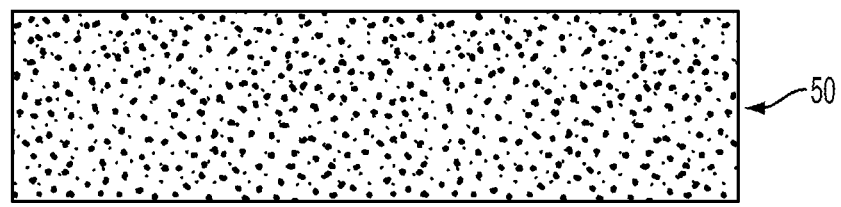
FIG. 4 shows an intermediate paving material made through the application of force by compaction of a construction material layer, a lime layer beneath the construction material layer, and a polymer layer beneath the lime layer, atop an existing road or surface.

FIG. 4 shows an intermediate paving material 50 made through the application of force by compaction of a construction material layer, a lime layer beneath the construction material layer, and a polymer layer beneath the lime layer, atop an existing road or surface.

Figure 5:
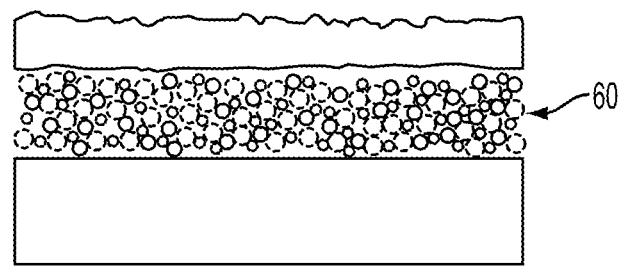
FIG. 5 shows an existing road or surface atop which has been placed a layer consisting essentially of polymer, lime and cross-linking agent, and atop which layer has been placed a construction material layer.

FIG. 5 shows an existing road or surface atop which has been placed a layer consisting essentially of polymer, lime and cross-linking agent 60, and atop which layer has been placed a construction material layer.

Figure 6:
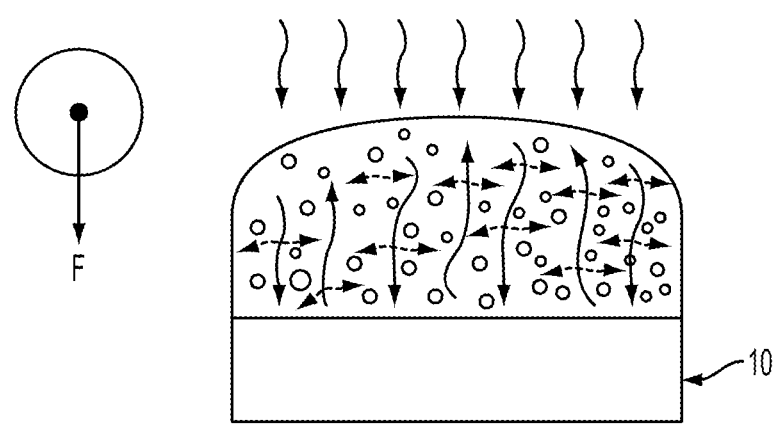
FIG. 6 shows mixing and cross-linking that has taken place through the application of force by compaction of a construction material layer and a layer beneath the construction material layer consisting essentially of polymer, lime and cross-linking agent, atop an existing road or surface.

FIG. 6 shows mixing and cross-linking that has taken place through the application of force by compaction of a construction material layer and a layer beneath the construction material layer consisting essentially of polymer, lime and cross-linking agent, atop an existing road or surface 10.

A material such as is described herein may be packaged, either individually or in entirety, for sale to a "do it yourself" (DIY) customer. Such packaged materials are used in a construction process such as is described herein; however, such DIY jobs are typically on a small scale. One may remove a packaged material such as is described herein contained in a package from the package and place it atop a surface. One may then cover the placed material with construction materials, add a diluent and compact the entirety of what has been placed atop the surface.

An example of a packaged material such as is described herein is a blend consisting of VAE dispersible polymer powder combined with an air lime in the range of 95% VAE DPP/5% air lime to 5% VAE DPP/95% air lime prepackaged and ready for sale.

An example of a packaged material such as is described herein is a blend consisting of VAE dispersible polymer powder, an air lime, a sodium borate and a waste material with the individual constituent material ranges from 5% to 95% each such that the sum of the constituent materials equals 100%.

An example of a packaged material such as is described herein is a bundle consisting of VAE liquid dispersion and both a solid air lime and a solid sodium borate pre-packaged in separate containers and sold together as a bundled unit for the purpose of improving the durability of a gravel or dirt road.

An example of a packaged material such as is described herein is a bundle consisting of VAE liquid dispersion and both a lime solution and a sodium borate solution pre-packaged in separate containers and sold together as a bundled unit for the purpose of improving the durability of a gravel or dirt road.

An example of a packaged material such as is described herein is a bundle consisting of VAE liquid dispersion, a solid air lime, a solid cross-linking agent and a solid waste material pre-packaged in separate containers and sold together as a bundled unit for the purpose of improving the durability of a gravel or dirt road.

An example of a packaged material such as is described herein is a bundle consisting of VAE liquid dispersion, a lime solution, a cross-linking agent solution and a solid waste material pre-packaged in separate containers and sold together as a bundled unit for the purpose of improving the durability of a gravel or dirt road.

Further example 1. A process for rapidly improving the durability of a dirt or gravel road, the process comprising:
(a) applying a superior surface to said road, said superior surface comprising a plurality of layers of durability-enhancing compositions and a diluent;
    one of said layers of durability-enhancing compositions, an inferior layer, consisting essentially of:
    (i) a dry latex polymer powder or an aqueous dispersion of a latex polymer, and optionally a cross-linking agent;
    (ii) dry lime or an aqueous solution of lime;
    (ii) a substantially dry mixture of latex polymer and lime, and optionally a cross-linking agent; or
    (iii) an aqueous dispersion comprising lime and latex polymer, and optionally a cross-linking agent;
    another of said layers of durability-enhancing compositions, a particulate layer, consisting essentially of a particulate matter, said particulate matter comprising a conventional building material or a waste material;
    and wherein the inferior layer is inferior to the particulate layer and is in direct contact with the dirt or gravel road;

(b) optionally contacting an amount of a cross-linking agent with at least a portion of the particulate layer and permitting at least a portion of the amount of the cross-linking agent to traverse the particulate layer and migrate onto and/or into the inferior layer;

(c) compacting the superior surface;

thereby rapidly improving the durability of the dirt or gravel road.

Further example 2. A process according to further example 1, wherein the inferior layer consists essentially of a dry latex polymer powder or an aqueous dispersion of a latex polymer.

Further example 3. A process according to further example 1, wherein the inferior layer consists essentially of dry lime or an aqueous solution of lime.

Further example 4. A process according to further example 1, wherein the inferior layer consists essentially of a substantially dry mixture of latex polymer and lime.

Further example 5. A process according to further example 1, wherein the inferior layer consists essentially of an aqueous dispersion comprising lime and latex polymer.

Further example 6. A process according to further example 1, wherein said particulate matter comprises a waste material.

Further example 7. A composition consisting essentially of a VAE dispersible polymer powder and an air lime, wherein the mass ratio of VAE dispersible polymer to air lime is between about 19:1 and about 1:19.

Further example 8. A composition consisting essentially of a VAE dispersible polymer powder and an air lime and a waste material, wherein the mass ratio of VAE dispersible polymer to air lime is between about 19:1 and about 1:19.

Further example 9. A composition according to further example 8, wherein the waste material comprises a coal combustion by-product, a granulated blast furnace slag, a ground granulated blast furnace slag, or a silica fume.

Further example 10. A composition according to further example 8, wherein the waste material consists essentially of a coal combustion by-product.

Further example 11. A kit for commercial sale comprising a composition according to further example 7 contained within a suitable container-closure system.

Further example 12. A kit for commercial sale comprising a composition according to further example 8 contained within a suitable container-closure system.

Further example 13. A kit for commercial sale comprising a composition according to further example 9 contained within a suitable container-closure system.

Further example 14. A kit for commercial sale comprising a composition according to further example 10 contained within a suitable container-closure system.

Further example 15. A kit for commercial sale comprising a VAE liquid dispersion contained within a first container-closure system and a lime material contained within a second container-closure system.

Further example 16. A kit according to further example 15 wherein the lime material comprises a solid air lime.

Further example 17. A kit according to further example 15 wherein the lime material comprises a lime solution.

Further example 18. A kit according to further example 15 further comprising a waste material contained within a third container-closure system.

Further example 19. A kit according to further example 18 wherein the lime material comprises a solid air lime.

Further example 20. A kit according to further example 18 wherein the lime material comprises a lime solution.

A surface the durability or performance of which may be improved by a material such as is described herein, or by a process such as is described herein, may be a road surface, a surface of a hiking trail, a surface of a bicycle path, a surface of a runway, and so forth. A surface the durability or performance of which may be improved by a material such as is described herein, or by a process such as is described herein, may be a surface of a trafficway, such as, for example, and not by way of limitation, a surface of a right of way, a highway, a pedestrian path, or a breezeway, or any surface suitable for transport or transit of vehicular traffic, aircraft traffic, bicycle traffic, pedestrian traffic, horse traffic, companion-animal traffic and the like.

Compaction to make a material such as is described herein, or to perform a process such as is described herein, may be effected by a manual, pedal or mechanized means. Compaction may be effected by repeated treading. Compaction may be effected by rolling of a road roller drawn by a draft animal such as a horse or a donkey or an ox or more generally a quadruped mammal. Compaction may be effected by rolling of a road roller pushed or drawn by a human being. Compaction may be effected by force applied by external diluent application such as by force applied by liquid or solid precipitation that has fallen during a severe thunderstorm or hailstorm. Compaction may be effected by a road roller such as a steamroller. Compaction may be effected by any of the following roller types:

Pedestrian Operated
Rammer (bounce up and down)
Walk-behind plate compactor/light
Walk-behind plate compactor/heavy (with reverse)
Trench roller (manual unit or radio-frequency remote control)
Walk-behind roller/light (single drum)
Walk-behind roller/heavy (double drum)
Ride-on Smooth Finish
Tandem drum (static)
Tandem drum (vibrating)
Single drum roller
Pneumatic-tire, a.k.a. rubber tire or multi-wheel
Combination roller (single row of tires and a steel drum)
Three point roller
Ride-on Soil/Landfill Compactor with Pads/Feet/Spikes
Single drum roller
4-wheel
3-point
Tandem drum
Other
Tractor-mounted or tractor-powered
Drawn roller or towed roller
Impact compactor (uses a square or polygon drum to strike the ground hard for proof rolling or deep lift compacting)
Drum roller with rubber coated drum
Log skidder converted to compactor
Wheel loader converted to compactor
Farm implement utilized as compaction device
Automobile utilized as compaction device
Truck utilized as compaction device
Pick up truck utilized as compaction device
Semi truck utilized as compaction device
Kneading compactor type rollers
Sheep's foot mechanized compactor In an experimental application of inter alia a process such as is described herein and a making of a material such as is described herein, an experimental intermediate pavement was constructed in a rural area on a rudimentary farm road but without any scarifying or tilling work performed on the farm road prior to placement of polymer thereon. A "bottom up" construction methodology was employed therefor. Briefly, a concentrated layer of polymer was placed atop the rudimentary farm road. This was covered with construction materials and exposed to either dry lime or lime solution and compacted in the presence of a diluent ultimately leading to migration of the polymer upward from the initial concentrated layer toward the pavement surface. This process created a concentration gradient of polymer increasing with pavement depth until the initial concentrated layer of polymer was reached. Such a concentration gradient provided increased resistance to erosion processes as the binding strength of the polymer, aggregate and fines increased with pavement depth. This methodology differed from surface spraying operations as surface spraying operations provide a binding layer of minimal depth which will yield completely to erosion processes once compromised.

Polymer, lime and diluent were covered with red gravel. The energy provided through the compaction process allowed the polymer to migrate upward toward the road surface ultimately forming a somewhat monolithic layer of bound aggregate and fines of substantial depth.

At a second and distinct focus area on the aforementioned farm road gravel was used to cover polymer, lime and randomly distributed areas of diluent. The compaction process allowed efficient migration of polymer upward, mixing with aggregate and fines creating a somewhat monolithic pavement layer.

In a particular experimental circumstance, a spreading of a load of gravel over polymer, lime and naturally occurring diluent took place immediately before a heavy rainfall. Once the abundance of aqueous diluent material was removed by naturally occurring processes, the estimated depth of bound aggregate and fines was 10 inches (25.4 cm) in critical application areas, thus an intermediate pavement material with functional depth of 10 inches (25.4 cm) had been formed in those critical, problematic areas.

The challenge in maintaining this particular section of road had previously been that the road is of lower elevation than the surrounding fields, thus collecting all runoff water after precipitation events. Such a wet environment provides ample opportunity for ejection of both fine particles and aggregate from wheel paths of passing vehicles or implements. In such a saturated condition, the binding processes provided by the combination of polymer film, lime and high clay content red gravel provided significant erosion resistance when compared with red gravel alone. One week after the aforementioned heavy rainfall, the road's surface and load carrying capacity had improved significantly.

Road surface texture obtained with excessive amounts of diluent addition was quite homogenous thereby forming a layer of bound fines, aggregate, lime and polymer.

A tractor end loader bucket full of high clay content red gravel provided a significant downward force through the front tires for compaction of the road surface.

This experimental instantiation showed that a method of developing an intermediate pavement material such as is described herein which utilized the "bottom up" technique did not require significant investment in larger pieces of equipment necessary for "scarifying" or "tilling" existing road surfaces, those surfaces in use for years which are often quite difficult to break up with conventional farming equipment.

In a particular section of farm road, no new materials were added between the aforementioned rainstorm and compaction some seven days later. Immediately after the precipitation event, the road surface was such that it would not allow compaction with available resources. Subsequent polymer and lime addition to the road surface which had been compacted some seven days after a precipitation event was undertaken. The road surface deformed considerably in spots during the compaction process. This surface deformation was a result of remaining aqueous diluent material from the precipitation event. The diluent material provided a suitable environment for polymer distribution, lime distribution and covering with construction materials before compaction. In such a "bottom up" process polymer was applied, lime was applied thereon, then construction material was applied thereon, and then the entirety of the materials applied were compacted in the presence of a diluent material allowing for polymer migration up through the construction material. A suitable and serviceable intermediate pavement resulted therefrom.

Every reference cited herein is incorporated fully by reference. To the extent that there be any conflict between the teaching of any reference and that of the instant specification, the teaching of the instant specification shall control.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A process for rapidly improving the durability of a dirt or gravel road, the process comprising:
  (a) applying a superior surface to said road, said superior surface comprising a plurality of layers of durability-enhancing compositions and a diluent;
    one of said layers of durability-enhancing compositions, an inferior layer, selected from the group consisting of:
      (i) a dry latex polymer powder or an aqueous dispersion of a latex polymer, and optionally a cross-linking agent;
      (ii) dry lime or an aqueous solution of lime;
      (iii) a substantially dry mixture of latex polymer and lime, and optionally a cross-linking agent; and
      (iv) an aqueous dispersion comprising lime and latex polymer, and optionally a cross-linking agent;
    another of said layers of durability-enhancing compositions, a particulate layer, consisting essentially of a particulate matter, said particulate matter comprising a conventional building material or a waste material;
    and wherein the inferior layer is inferior to the particulate layer and is in direct contact with the dirt or gravel road;
  (b) contacting an amount of a cross-linking agent with at least a portion of the particulate layer and permitting at least a portion of the amount of the cross-linking agent to traverse the particulate layer and migrate onto and/or into the inferior layer, and wherein the cross-linking agent is one or more members of the set consisting of sodium borate, sodium tetraborate, disodium tetraborate, potassium borate, and maleic anhydride; and
  (c) compacting the superior surface;
thereby rapidly improving the durability of the dirt or gravel road.

2. A process according to claim 1, wherein the cross-linking agent is sodium borate.

3. A process according to claim 1, wherein the cross-linking agent is sodium tetraborate.

4. A process according to claim 1, wherein the cross-linking agent is disodium tetraborate.

5. A process according to claim 1, wherein the cross-linking agent is potassium borate.

6. A process according to claim 1, wherein the cross-linking agent is maleic anhydride.

7. A process according to claim 1, wherein the inferior layer consists essentially of a dry latex polymer powder or an aqueous dispersion of a latex polymer.

8. A process according to claim 1, wherein the inferior layer consists essentially of dry lime or an aqueous solution of lime.

9. A process according to claim 1, wherein the inferior layer consists essentially of a substantially dry mixture of latex polymer and lime.

10. A process according to claim 1, wherein the inferior layer consists essentially of an aqueous dispersion comprising lime and latex polymer.

11. A process according to claim 1, wherein said particulate matter comprises a waste material.

12. A process according to claim 1, wherein the contacting the amount of the cross-linking agent with at least a portion of the particulate layer is initiated prior to the compacting.

13. A process according to claim 1, wherein the contacting the amount of the cross-linking agent with at least a portion of the particulate layer is initiated during the compacting.

14. A process according to claim 1, wherein the contacting the amount of the cross-linking agent with at least a portion of the particulate layer is initiated subsequent to the compacting.

* * * * *